US005769391A

United States Patent [19]

Noller et al.

[11] Patent Number: 5,769,391

[45] Date of Patent: Jun. 23, 1998

[54] ELECTROMAGNETICALLY ACTUATED VALVE

[75] Inventors: Klaus Noller, Oppenweiler; Jürgen Graner, Sersheim; Peter Asslaender, Bamberg; Peter Stieglitz, Bamberg; Marita Geisendoerfer-Pipp, Forchheim; Detlef Malinowski, Oberhaid; Michael Lips, Bamberg; Rudolf Kalb, Buttenheim; Karl-Heinz Jaeger, Baunach; Robert Trunk, Bamberg; Andre Knackstedt, Gundelsheim; Heidi Arleth, Walsdorf; Stefan Maier, Schwieberdingen, all of Germany

[73] Assignee: Robert Bosch GmbH, Stuttgart, Germany

[21] Appl. No.: 721,983

[22] PCT Filed: Jan. 18, 1996

[86] PCT No.: PCT/DE96/00064

§ 371 Date: Jan. 6, 1997

§ 102(e) Date: Jan. 6, 1997

[87] PCT Pub. No.: WO96/24763

PCT Pub. Date: Aug. 15, 1996

[30] Foreign Application Priority Data

Feb. 6, 1995 [DE] Germany ........................ 19 503 821.5

[51] Int. Cl.[6] ...................................................... F16K 31/06

[52] U.S. Cl. .................................... 251/129.21; 239/585.4

[58] Field of Search ......................... 251/129.21, 129.15; 239/585.1, 585.2, 585.4, 585.5; 335/262

[56] References Cited

U.S. PATENT DOCUMENTS

| | | | |
|---|---|---|---|
| 5,009,390 | 4/1991 | McAuliffe, Jr. et al. | 251/129.21 X |
| 5,143,301 | 9/1992 | Reiter et al. . | |
| 5,178,362 | 1/1993 | Vogt et al. | 239/585.1 X |

FOREIGN PATENT DOCUMENTS

| | | |
|---|---|---|
| 3831 196 C2 | 3/1990 | Germany . |
| 40 03 227 | 1/1991 | Germany . |

*Primary Examiner*—Kevin Lee
*Attorney, Agent, or Firm*—Kenyon & Kenyon

[57] ABSTRACT

In a valve, the number of components of the valve pipe is reduced, so that the number of joints and connecting points is also reduced,. The entire valve pipe is manufactured from magnetically conductive material, so that one can dispense with non-magnetic adapters. The valve is especially suited for use in fuel-injection systems of mixture-compressing internal-combustion engines having externally supplied ignition.

23 Claims, 8 Drawing Sheets

ELECTROMAGNETICALLY ACTUATED VALVE

FIELD OF THE INVENTION

The present invention relates to an electromagnetically actuated valve.

BACKGROUND INFORMATION

The German Patent No. 40 03 227 describes an electromagnetically actuated valve, whose valve pipe, as the fundamental structure of the valve, is composed of three parts. On the one hand, a magnetic valve-seat support is provided, through which the magnetic flux enters radially via a radial air gap into an armature fastened to a valve needle. On the other hand, a core serves as a magnetic internal pole, which is disposed upstream from the valve-seat support and which directs the magnetic flux in the axial direction. In addition, the valve pipe also has a non-magnetic adapter, which joins the core and the valve-seat support to one another, forming a hydraulic seal. Thus, the non-magnetic adapter does not conduct any magnetic flux, so that the magnetic flux passes through the armature as useful flux and the magnetic circuit has a high level of effectiveness. However, three individual component parts must be individually manufactured in a precision operation, placed in a defined position relative to one another, and then joined together. As a result, at least two joints or connecting points e.g., welds, are formed, which entail additional outlay and have the attendant danger that the parts to be welded together and to become deformed during welding due to thermally produced strains.

SUMMARY OF THE INVENTION

One of the advantage of the electromagnetically actuated valve according to the present invention, is that the valve pipe has an especially simple design, since it is composed of fewer component parts, so that the number of joints and connecting points is reduced cost-effectively because only magnetically conductive material is used for the entire valve pipe, and the quality of the magnetic circuit is, nevertheless, not compromised. This is achieved in that, in the axial extension region of the armature, the valve pipe according to the present invention has a magnetically conductive choke site which is thin-walled in the radial direction, is quickly saturable, and is used to limit the magnetic stray flux to a minimum.

It is further advantageous to design the valve pipe in one piece, in order to guarantee the hydraulic seal tightness in any case. The one-piece valve pipe extends completely over the entire length of the valve and, thus, also determines the same.

In two-part design approaches, according to the present invention it is advantageous for the material used for the valve-seat support with the choke site to have a substantially lower saturation flux density than that used for the core. A solution would be provided, e.g., by nickel-iron alloys or pure nickel, in which the saturation flux densities amount to about 0.5 tesla (T). The choke site reaches its saturation point even earlier, so that, e.g., the choke cross-section of the choke site can be enlarged to attain a greater mechanical strength for the valve pipe.

It is also important to provide the magnetic choke site so that at least one guide surface provided on the armature moves past to the extent that is possible in one axially central region of the choke site during the axial movement of the valve needle. The same advantage is also attained when the guide surfaces for the armature lie directly in the axially central region of the choke site. Only in this manner can the lateral forces that arise be kept to a minimum.

DETAILED DESCRIPTION OF THE INVENTION

Figure 1:
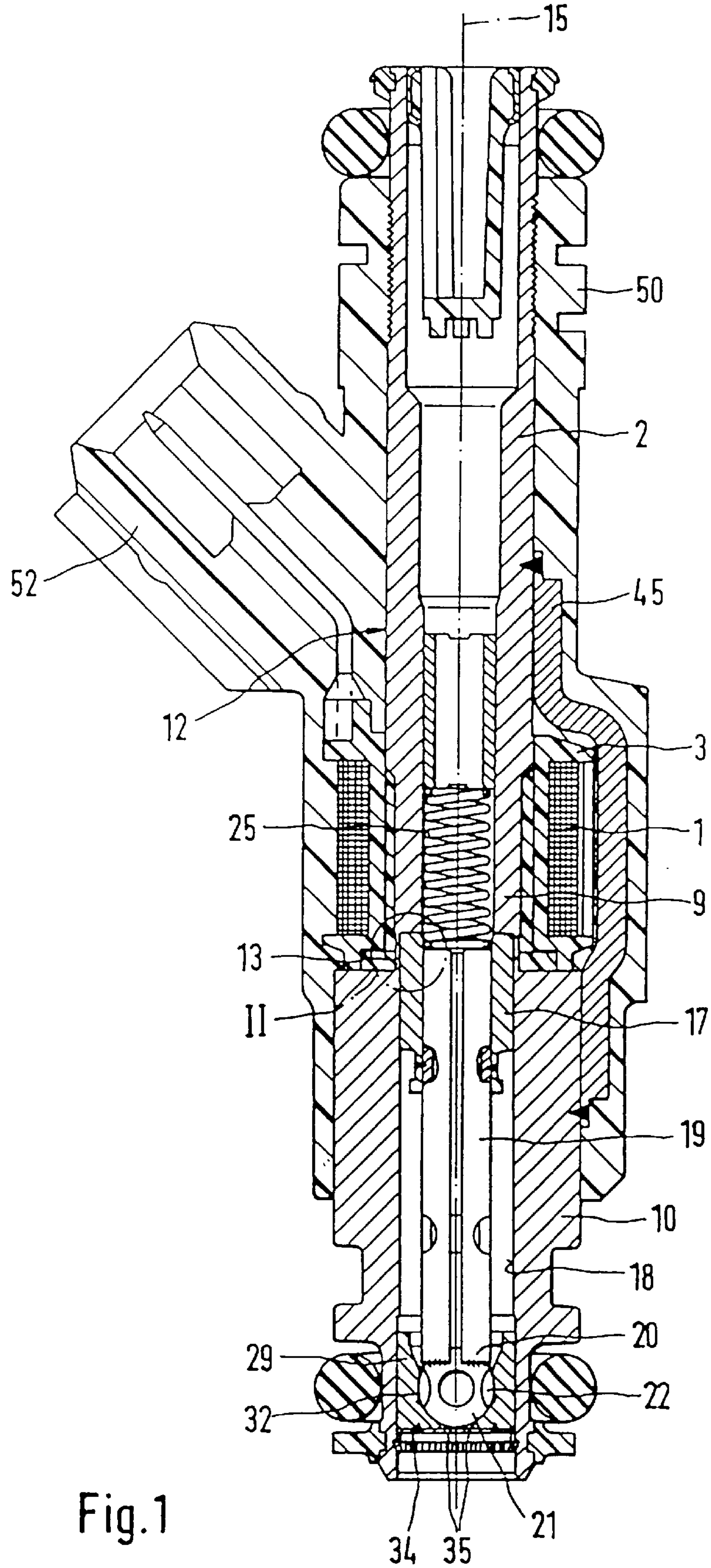
FIG. 1 shows a first exemplary embodiment of a first valve according to the present invention.

The electromagnetically actuated valve according to the present invention shown in FIG. 1. The valve includes of an injector for fuel-injection systems of mixture-compressing internal-combustion engines with externally supplied ignition has a tubular core 2 as a so-called internal pole, which is surrounded by a solenoid coil 1 and serves as a fuel-intake nipple. A coil form 3 accommodates a winding of the solenoid coil 1. Now, unlike injectors under the state of the art, core 2 is not designed as a component which also actually ends with one core end 9, but rather continues to run in the downstream direction, so that a tubular connection part, which is arranged downstream from the coil form 3 and is designated in the following as valve-seat support 10 and is designed as a so-called external pole in one piece with core 2, the entire component being designated as valve pipe 12. As a transition from core 2 to valve-seat support 10, valve pipe 12 likewise has a tubular, but a substantially thinner inner wall than magnetic choke site 13 having the wall thicknesses of core 2 and valve-seat support 10.

The magnetic choke site 13 proceeds from the lower core end 9 of the core 2 concentrically to a longitudinal valve axis 15, around which the core 2 and the valve-seat support 10 also extend concentrically, for example. In conventional injectors, metallic, non-magnetic adapters are provided in this region, which is directly downstream from core end 9, to magnetically separate core 2 and valve-seat support 10. It is, thus, guaranteed when working with the conventional injectors that the magnetic flux immediately goes around the non-magnetic adapter in the electromagnetic circuit by way of an armature 17. When working with the arrangement according to the present invention, the injector is also actuated in the generally known electromagnetic manner.

A longitudinal bore 18, formed concentrically to longitudinal valve axis 15, runs in valve-seat support 10. Arranged in longitudinal bore 18 is a, for example, tubular valve needle 19, which is joined, for example by means of welding, at its downstream end 20 to a spherical valve-closure member 21, on whose periphery are provided, for example, five flattened areas 22 to allow the fuel to flow past.

The electromagnetic circuit having solenoid coil 1, core 2, and armature 17 is used to axially move the valve needle 19 and, thus, to open the injector opposite the spring resistance of a restoring spring 25 or to close the injector. The armature 17 is joined by a weld to the end of valve needle 19 facing away from valve-closure member 21 and is aligned to core 2. A cylindrical valve-seat member 29, which has a fixed valve seat, is imperviously mounted by means of welding in the downstream end of valve-seat support 10 facing away from core 2.

A guide opening 32 of valve-seat member 29 is used to guide valve-closure member 21 during the axial movement of valve needle 19 with armature 17 along the longitudinal valve axis 15. The spherical valve-closure member 21 interacts with the valve seat of valve-seat member 29 that is tapered frustoconically in the direction of flow. At its front end facing away from valve-closure member 21, valve-seat member 29 is permanently fixed to for example, a pot-shaped spray-orifice plate 34. The pot-shaped spray-orifice plate 34 has at least one, for example four spray orifices 35 formed by means of erosion or punching. When working with conventional injectors, to exactly guide armature 17 joined to valve needle 19 during the axial movement, the non-magnetic adapters are used, which are manufactured with exceptional precision and accuracy, e.g., on precision lathes in order to achieve a small guidance play. Since no adapter is needed when working with the injector according to the present invention, it is beneficial to provide at least one guidance surface 36 (FIG. 2), which is manufactured, for example, by means of machine-cutting, on the outer periphery of armature 17. The at least one guidance surface 36 can be designed, e.g., as a circumferential, continuous guide ring, or as a plurality of guidance surfaces formed on the periphery with clearance from one another.

The insertion depth of the valve-seat member 29 with the pot-shaped spray-orifice plate 34 determines the magnitude of the lift of the valve needle 19. In this case, the one end position of valve needle 19, given an unexcited solenoid coil 1, is determined by the seating of valve-closure member 21 on the valve seat of valve-seat member 29, while the other end position of valve needle 19, given an excited solenoid coil 1, follows from the seating of armature 17 at the core end 9.

The solenoid coil 1 is surrounded by at least one conductive element 45, which is designed, for example, as a bracket and serves as a ferromagnetic element and at least partially surrounds the solenoid coil 1 in the circumferential direction and abuts with its one end on core 2 and its other end on valve-seat support 10 and is connectible to said valve-seat support 10, e.g., by means of welding, soldering or bonding.

The injector is largely enclosed by a plastic extrusion coat 50, which extends from core 2, emanating in the axial direction, over solenoid coil 1, and the at least one conductive element 45 extends to the valve-seat support 10, the at least one conductive element 45 being completely covered axially and in the circumferential direction. An electrical plug connector 52, for example, belongs to this plastic extrusion coat 50 and is extruded on along with it. The one-piece valve pipe 12 extends completely over the entire length of the injector and, thus, also determines the same.

Figure 2:
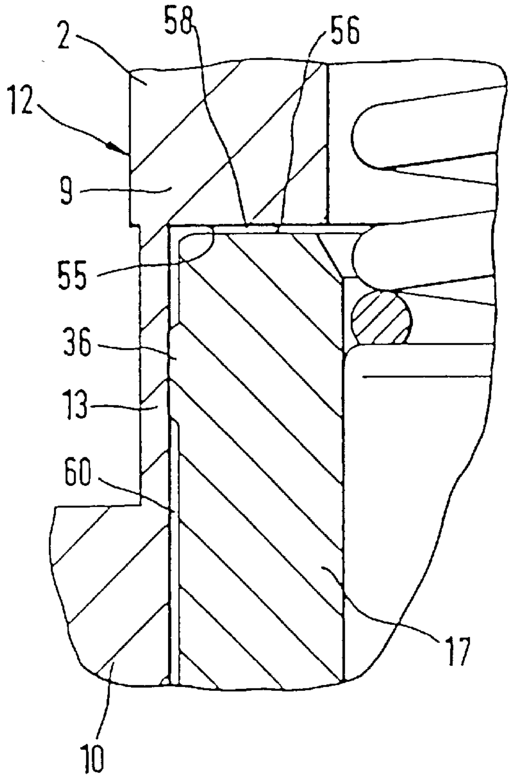
FIG. 2 shows a detail of the first valve arrangement positioned near the choke, according to the first embodiment of the present invention.

A detail of the injector shown in FIG. 1 is depicted in FIG. 2 in the area of the magnetic choke site 13. The core end 9 of core 2 has a downstream end face 55, which serves as the stop face for armature 17 with its upper end face 56. Given a closed valve, i.e., when valve-closure member 21 abuts on the valve seat of valve-seat member 29, an air gap 58 with an axial extent of 60 $\mu$m exists between the two end faces 55 and 56. Together with the layers of chrome, e.g., altogether 30 $\mu$m thick, applied to the end faces 55 and 56, a so-called working air gap with an extent of 90 $\mu$m in the axial direction is produced as a residual air gap. Ordinarily, one can assume that a magnetic circuit is all the better, the less stray flux by-passes the working air gap.

Thus, the valve pipe 12 according to the present invention still has only a one-piece design and, therefore, has a direct magnetically conductive connection between core 2 and valve-seat support 10 via magnetic choke site 13. To keep air gap 58 or the stray flux that circumvents the working air gap as small as possible, the magnetic choke site 13 is designed to have a very small wall thickness. The magnetic choke site 13 that is 2 mm long, e.g., in the axial direction has a wall thickness of 2 mm. Consequently, a minimum limiting value is approximately reached, at which an adequate stability of the valve pipe 12 is still guaranteed. Thus, when excited, the magnetic flux in the magnetic circuit also passes via the very narrow magnetic choke site 13. The saturation flux density is thereby reached in a very short time, namely only in a fraction of the actual operating time of the valve. The magnetic choke site 13 that is saturated and has a permeability of about 1 now actually also functions as a choke site.

As a result of the at least one guide surface 36, which is premolded on armature 17 and extends over the actual outer diameter of armature 17 radially to the outside, a radial air gap 60 is formed outside of guide surface 36 between magnetic choke site 13 or valve-seat support 10 and armature 17. This radial air gap 60 should be designed to be as narrow as possible, since the magnetic flux enters radially via the air into the armature 17. Taking the hydraulic conditions into consideration, the radial air gap 60 is, e.g., 80 $\mu$m wide. In comparison to a conventional injector with the non-magnetic adapter, in this arrangement, the entire magnetic flux in the injector increases by the amount of the magnetic flux across the choke site 13. The remaining conductive cross-sections of core 2 and of conductive element 45 must be adapted or minimally enlarged accordingly.

Figure 3:
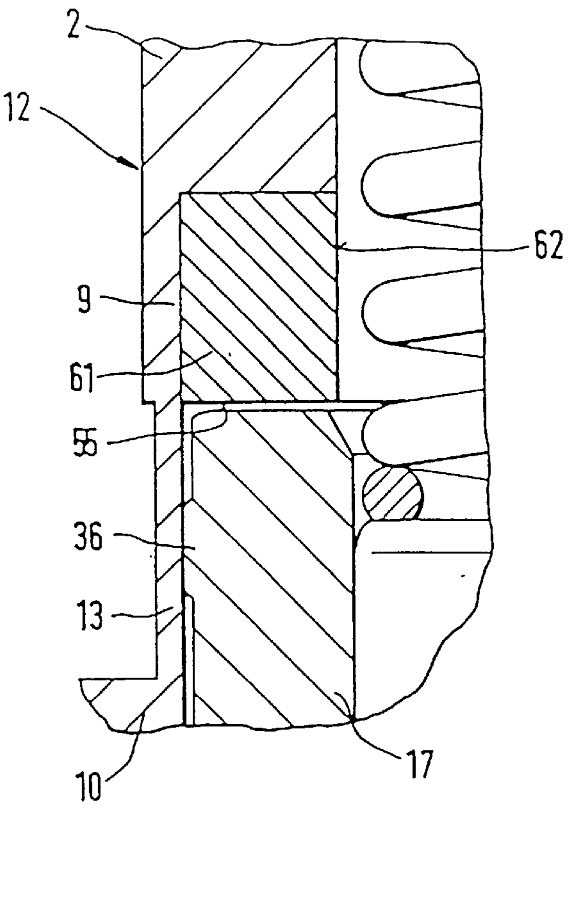
FIG. 3 shows a detail of the second valve arrangement positioned near the choke site.

The detail shown in FIG. 3 likewise shows the area of the magnetic choke site 13, in this second exemplary embodiment, according to the present invention an annular limit-stop piece 61 being installed at core end 9 of core 2. The limit-stop piece 61 is designed, e.g., to be large enough to even delimit an inner passage 62 of core 2 and is only surrounded by core 2 radially to the outside as well as upwardly in the direction of plug connector 52. On its bottom end face 55, the limit-stop piece 61 is chrome-plated, for example, similarly to the limit stop region at core end 9, without a limit-stop piece. Such a limit-stop piece 61 has the advantage over the example shown in FIG. 2 that the precise machining of the limit-stop region can still take place outside of valve pipe 12 and only after that is limit-stop piece 61 secured to core end 9. Possible ways for securing limit-stop piece 61 are, for example, press-fitting or external laser fastening. Another fastening variant consists in holding limit-stop piece 61 to core 2 solely by means of the residual magnetism in the always closed magnetic circuit.

Figure 4:
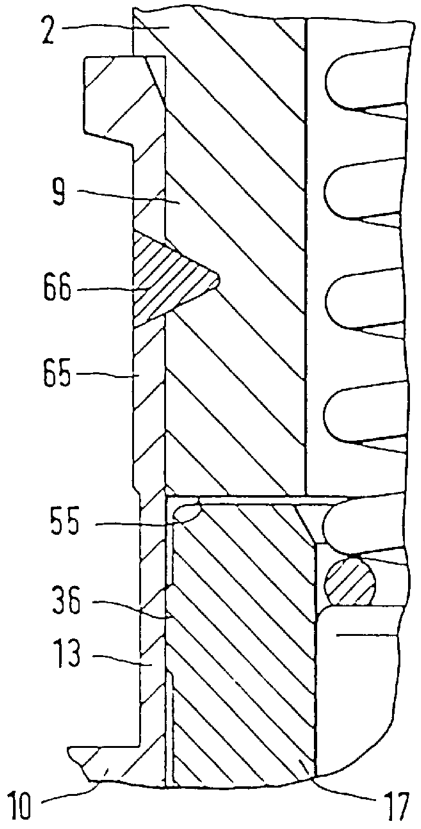
FIG. 4 shows a detail of the third valve arrangement positioned in the area of the choke site.

In the third exemplary embodiment shown in FIG. 4, the valve pipe 12 has a two-part design and consists, in fact, of core 2 and valve-seat support 10. Provided on valve-seat support 10 in one piece is the magnetic choke site 13, which, as in the other examples, emanates from the valve-seat support 10 as a very narrow (small wall thickness) cylindrical region. Viewed in the axial direction, this narrow choke site 13 does not change directly into core 2. Instead, e.g., starting with end face 55, a wider sleeve section 65, which radially surrounds core 2 in the area of core end 9, is axially contiguous to choke site 13. Consequently, sleeve section 65 represents the upstream end of valve-seat support 10. The valve-seat support 10 and core 2 are permanently joined, for example, by a circumferential weld 66 in the area of sleeve section 65, which is able to be produced, e.g., by means of a laser. This two-part design approach has the advantage, in turn, that end face 55 of core 2 is able to be simply machined as a stop means, since sleeve section 65 of valve-seat support 10 is not secured to core 2 until later. Nevertheless, in the case of this two-part connecting pipe 12, as well, core 2 and valve-seat support 10 are directly and magneto-conductively interconnected. In principle, the magnetic choke site 13 can also be designed in the same way in one piece with core 2, the permanent connection then being made, for example, between a sleeve section (not shown) of core 2 and valve-seat support 10.

The demands placed on the saturation flux density in valve-seat support 10 are clearly less than those placed on the saturation flux density of core 2, since the radial transfer surface of the magnetic flux from valve-seat support 10 to armature 17 is substantially larger (e.g., four times as large) than the cross-sections of armature 17 and core 2. Now, when a material with a very low saturation flux density, e.g., a nickel-iron alloy with about 0.5 T is used for the two-part design of valve-seat support 10 with choke site 13, then choke site 13 reaches saturation earlier on. On the other hand, the saturation flux density of the ferritic chromium steel used for core 2 amounts, for example, to 1.8 T. Therefore, this material selection offers new possibilities for designing magnetic circuits. On the one hand, the magnetic flux can be reduced by way of the choke site 13 to improve valve functioning and, on the other hand, the choke cross-section of choke site 13 can be increased to achieve a greater mechanical strength for valve pipe 12, given the same magnetic stray flux.

Figure 6:
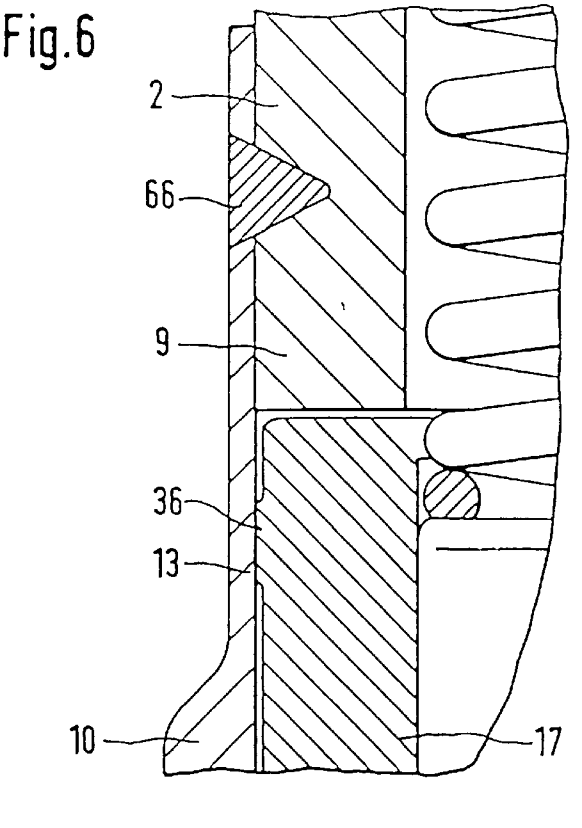
FIG. 6 shows a detail of the fourth valve arrangement in the area of the choke site.
Figure 5:
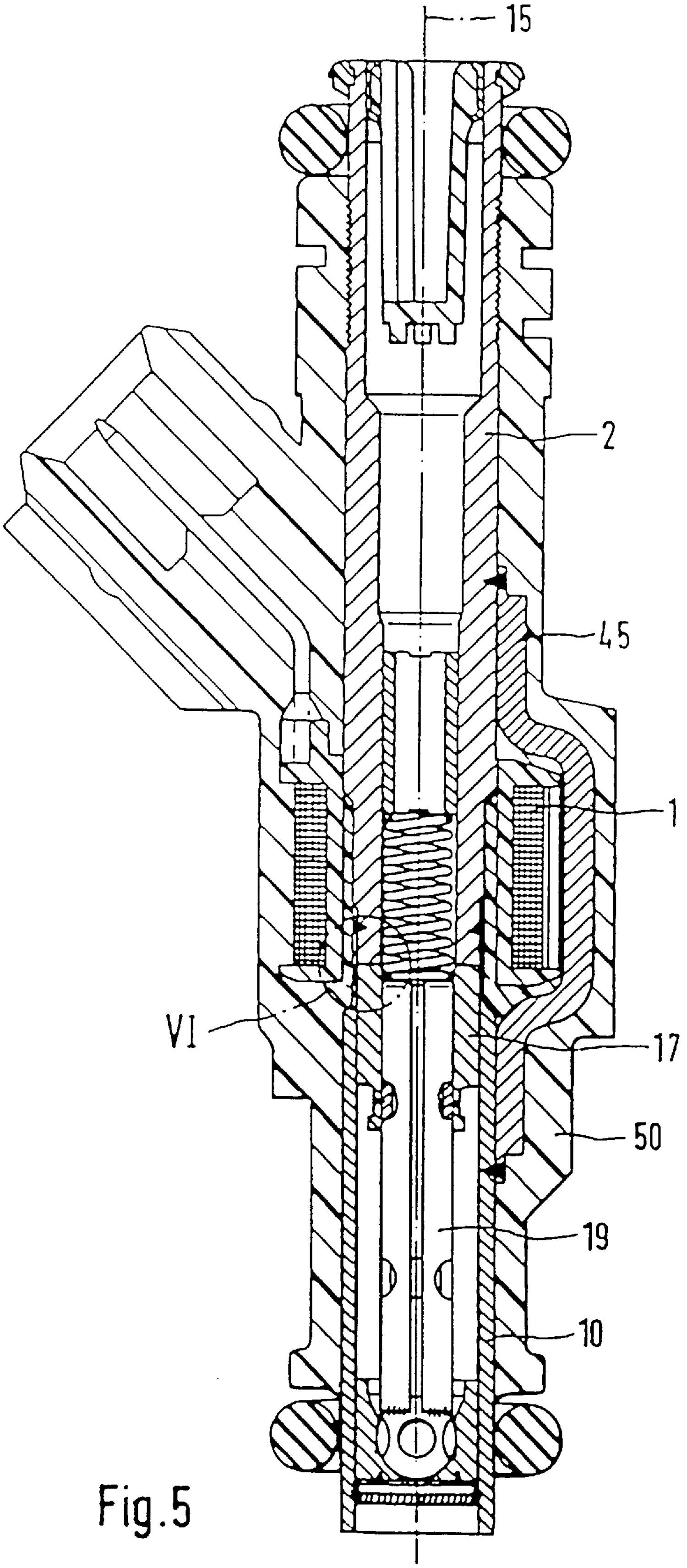
FIG. 5 shows a second exemplary embodiment of the valve according to the present invention.

The valve-seat support 10 in the fourth exemplary embodiment shown in FIGS. 5 and 6 according to the present invention differs from that previously shown and described, namely in that it is sleeve-shaped. The sleeve-shaped valve-seat support 10 has a substantially constant wall thickness, so that the outer contours necessary for installing the injector are realized by the shaping of the plastic extrusion coating 50. Apart from that, the sleeve-shaped valve-seat support 10 fulfills the same functions as the valve-seat support 10 in FIGS. 1 through 4. At its upstream end, the sleeve-shaped valve-seat support 10 is stretched out, i.e., produced with a clearly smaller wall thickness than over its entire remaining length. This reduction in wall thickness takes place in the axial area of armature 17, by which means, in turn, the magnetic choke site 13 is created. The valve-seat support 10 subsequently extends to choke site 13, e.g., with its reduced wall thickness, still further upstream, and there first radially surrounds core 2 at its core end 9. A permanent connection of valve-seat support 10 and core 2 is again established by means of weld 66. The wall thickness of valve-seat support 10 outside of the stretched-out region is conceived so as to guarantee adequate valve stability. Since the choke cross-section is very small because of the stretched-out, a cost-effective, ferritic chromium steel having a high saturation flux density can also be used for the valve-seat support 10, just as it is for the core 2. The magnetic choke site 13 has, e.g., a wall thickness of 0.2 mm.

Figure 7:
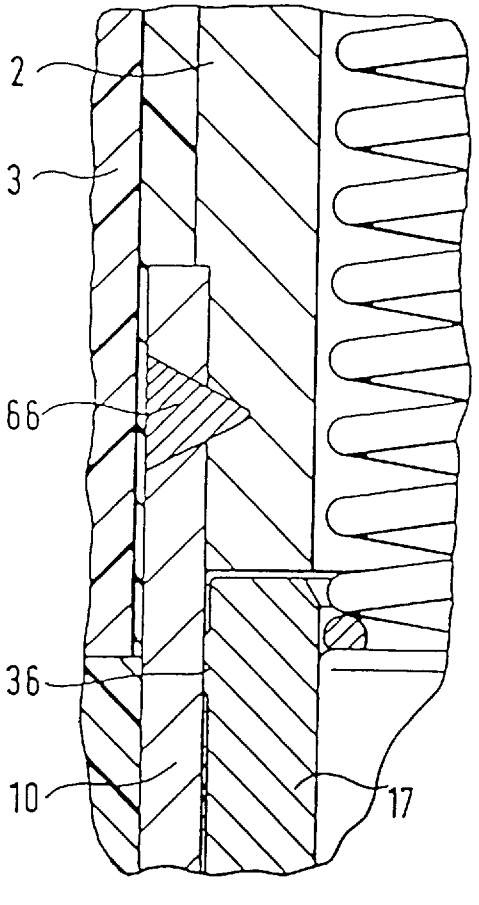
FIG. 7 shows a detail of the fifth valve arrangement in the area of the choke site.

In yet another exemplary embodiment shown in FIG. 7, a valve-seat support 10 is used, which has a constant wall thickness over its entire length, e.g. 0.5 mm. This thicker sleeve-shaped valve-seat support 10 is distinguished by a higher stability, also in the axial extension region of armature 17 and of core 2. Now, however, a material is needed, which is magnetically poorly conductive and also has a low saturation flux density. Nickel-iron alloys or pure nickel have, e.g., saturation flux densities of about 0.5 T. The choke cross-section, which in this example is not characterized by a directly formed magnetic choke site 13 would otherwise permit too much stray flux, thus when working with materials having saturation flux densities clearly over 0.5 T. Core 2 consists, e.g., of ferritic chromium steel.

The considerations in the following refer to the design of the armature guidance, particularly to the exemplary embodiments shown in FIGS. 1 through 6 with clearly formed choke sites 13. Because of the lack of a non-magnetic adapter, serving, among other things, also for the guidance of the valve needle 19 or of the armature 17 during the axial movement of the valve needle 19, another possibility for guidance must now be found when working with the injectors according to the present invention. When working with the injectors having the non-magnetic adapter, the armature-adapter contact surface is, therefore, non-magnetic, so that no significant lateral magnetic forces arise. In accordance with the radial air gap between the armature and the adapter and the guidance play, at the most a ratio of a maximum to minimum radial air gap of 2:1 can result. Because of the uneven flux distribution, lateral forces, e.g., of up to 0.5N can occur, which, however, are not of concern.

In the case of the structural design according to the present invention of the valve pipe 12 with the magnetic choke site 13, the armature 17 is now brought to magnetic material, the two magnetic materials still being separated merely by an, e.g., 10 $\mu$m thick chrome layer at the armature 17. Given the same guidance play of about 40 $\mu$m, a ratio of a maximum to minimum radial air gap 60 of 5:1 can thus arise, which can be the cause of a markedly uneven distribution of the magnetic flux in the radial air gap 60. Lateral forces of up to 4N can occur. Therefore, the position of the armature guidance in the axial direction represents an important criterion that is specific to design and magnetic circuit considerations.

Figure 8:
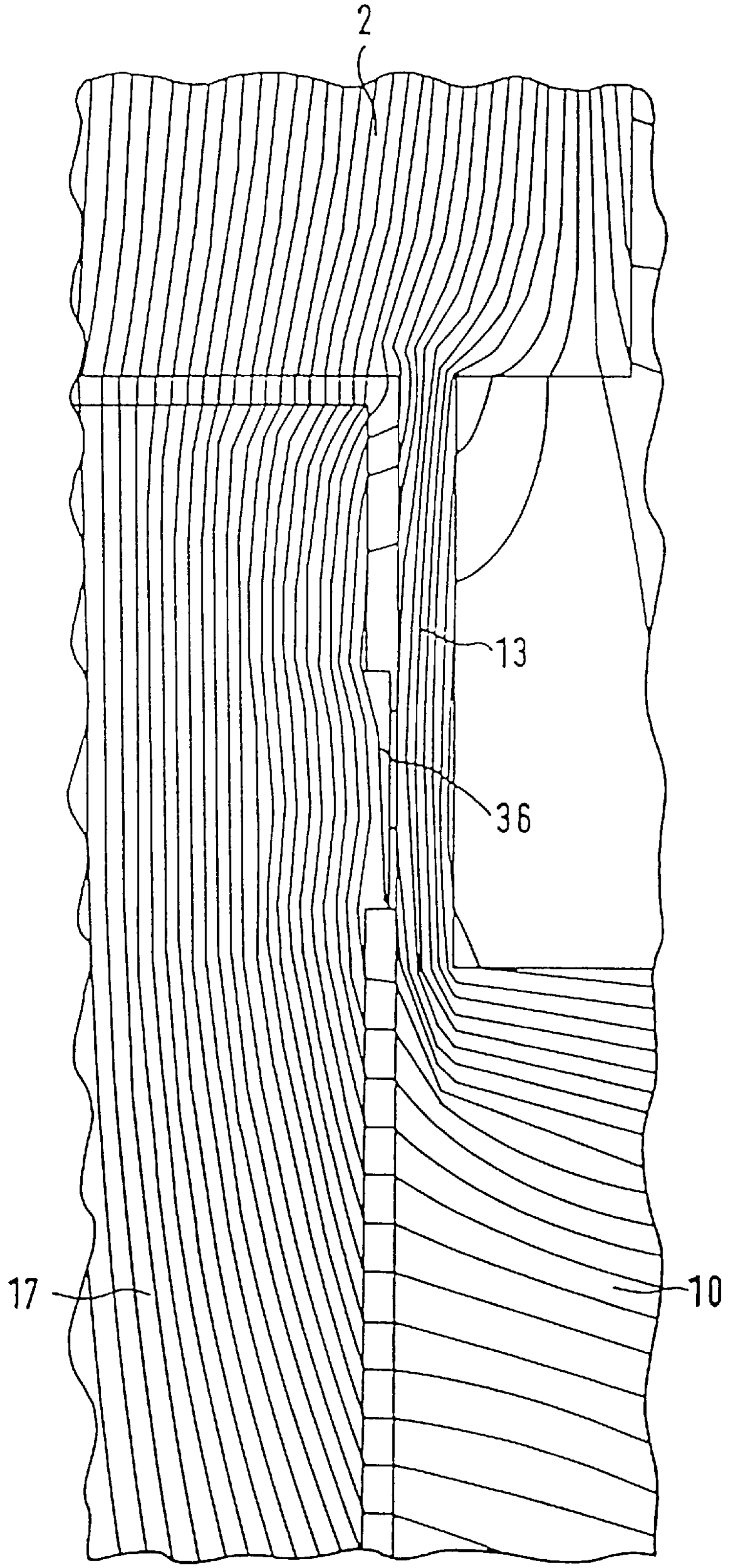
FIG. 8 shows a magnetic field pattern relative to a guide surface on the armature in an axial extension region of the choke site according to the present invention.
Figure 9:
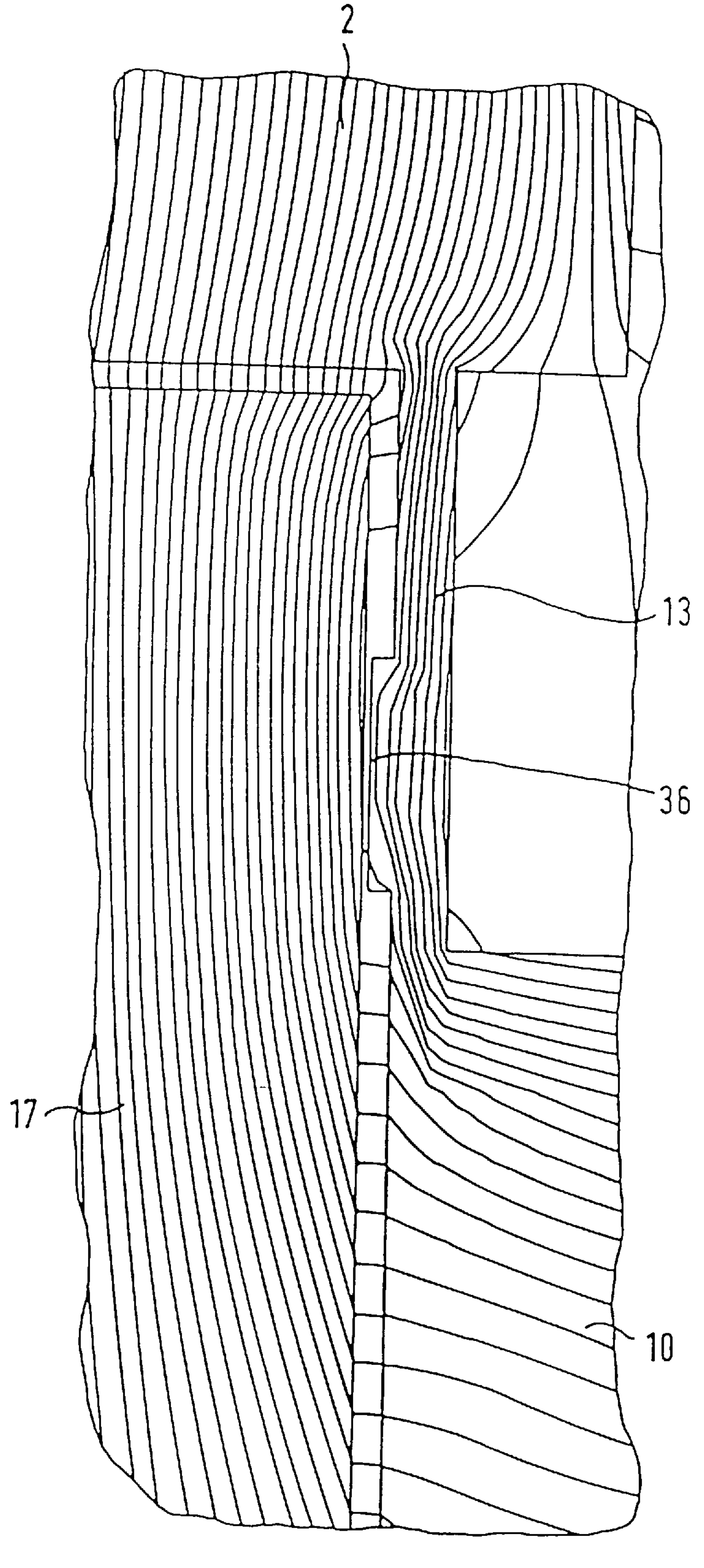
FIG. 9 shows a magnetic field pattern relative to a guide surface on the choke site according to the present invention.
Figure 10:
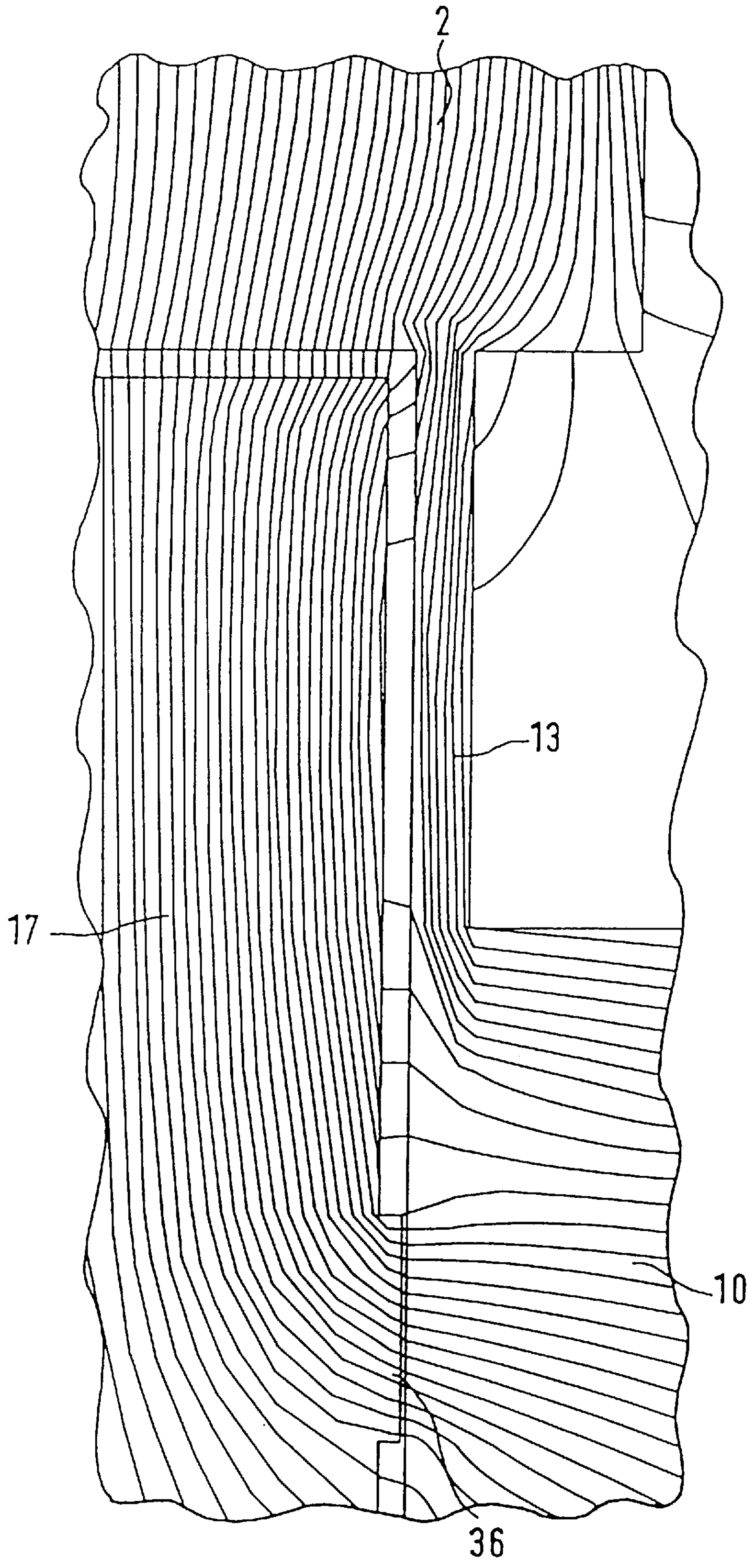
FIG. 10 shows a magnetic field pattern relative to a guide surface on the armature outside of the choke site.

FIGS. 8 through 10 show details of injectors, which correspond, e.g., to the injector according to the present invention as shown in FIG. 1. The injectors show the regions around the magnetic choke site 13 and, in addition, elucidate the pattern of the magnetic lines of force. The magnetic flux, which enters radially from the valve-seat support 10 into the armature 17 and causes the substantial lateral forces, can be kept particularly small when the at least one guide surface 36 lies in the axial extension region of the magnetic choke site 13. The choke site 13 which reaches its saturation very quickly ensures that only little magnetic flux can still attain the guide surface 36.

Magnetic field calculations have revealed that hardly any magnetic flux at the guide surface 36 flows over into armature 17 and no more additional lateral forces arise when the guide surface 36 lies in the area of the choke site 13, as shown in FIGS. 8 and 9. The guide surface 36 should thereby be arranged mostly centrally, viewed over the axial extension length of the choke site 13. The guide surface 36 must not be directly contiguous to the core 2, since again other magnetic flux conditions prevail there, which lead to larger lateral forces. With respect to the pattern of the magnetic flux and the magnitude of the lateral forces, it is not at all important whether the guide surfaces 36 are formed at armature 17 (FIG. 8) or at choke site 13 of valve-seat support 10 (FIG. 9). Suitable methods for manufacturing the guide surfaces 36 are, e.g., stamping, plastic rolling, or also cutting methods. For comparison purposes, FIG. 10 illustrates an arrangement where a guide surface 36 is provided on the armature 17 outside of the choke site 13. The magnetic lines of force indicate that a high magnetic flux passes over from the valve-seat support 10 into the guide surface 36 of the armature 17, thus allowing substantial lateral forces to act on the armature 17, given an armature 17 that is not exactly centrally situated. Therefore, such an arrangement should be avoided.

We claim:

1. An electromagnetically actuated valve, comprising:

a solenoid coil;

a core surrounded by the solenoid coil;

a valve-closure member interacting with a fixed seat valve;

an armature actuating the valve-closure member;

a tubular connection part positioned downstream from the core and at least partially surrounding the armature, the core and the connection part being directly and magneto-conductively interconnected via a magnetic choke sites; the core, the magnetic choke site and the connection part being integrally formed as one component part.

2. The electromagnetically actuated valve according to claim 1, wherein the magnetic choke site has a first wall width, the core having a second wall width, the connection part having a third wall width, the first wall width being smaller than each one of the second and third wall widths.

3. The electromagnetically actuated valve according to claim 1, wherein the magnetic choke site has a wall thickness, the wall thickness being between 0.2 and 0.5 mm.

4. The electromagnetically actuated valve according to claim 1, wherein the magnetic choke site is formed in an axial extension region of the armature.

5. The electromagnetically actuated valve according to claim 1, wherein the armature includes at least one guide surface for axially guiding the armature, the at least one guide surface being positioned in an axial extension region of the magnetic choke site, the at least one guide surface being completely radially surrounded by the magnetic choke site.

6. The electromagnetically actuated valve according to claim 1, wherein the magnetic choke site includes at least one guide surface for axially guiding the armature.

7. An electromagnetically actuated valve, comprising:

a solenoid coil;

a core surrounded by the solenoid coil;

a valve-closure member interacting with a fixed seat valve;

an armature actuating the valve-closure member;

a tubular connection part positioned downstream from the core and at least partially radially surrounding the armature, the core and the connection part being directly and magneto-conductively interconnected via a magnetic choke site; the magnetic choke site being integrally formed with the core as one component.

8. The electromagnetically actuated valve according to claim 7, wherein the magnetic choke site has a first wall width, the core having a second wall width, the connection part having a third wall width, the first wall width being smaller than each one of the second and third wall widths.

9. The electromagnetically actuated valve according to claim 7, wherein the core is permanently radially joined to the connection part outside of the magnetic choke site.

10. The electromagnetically actuated valve according to claim 7, wherein the magnetic choke site has a wall thickness, the wall thickness being between 0.2 and 0.5 mm.

11. The electromagnetically actuated valve according to claim 7, wherein the magnetic choke site is formed in an axial extension region of the armature.

12. The electromagnetically actuated valve according to claim 7, wherein the armature includes at least one guide surface for axially guiding the armature, the at least one guide surface being positioned in an axial extension region of the magnetic choke site, the at least one guide surface being completely radially surrounded by the magnetic choke site.

13. The electromagnetically actuated valve according to claim 7, wherein the magnetic-choke site includes at least one guide surface for axially guiding the armature.

14. An electromagnetically actuated valve, comprising:

a solenoid coil;

a core surrounded by the solenoid coil;

a valve-closure member interacting with a fixed seat valve;

an armature actuating the valve-closure member;

a tubular connection part positioned downstream from the core and at least partially radially surrounding the armature, the core and the connection part being directly and magneto-conductively interconnected via a magnetic choke site; the magnetic choke site being integrally formed with the connection part.

15. The electromagnetically actuated valve according to claim 14, wherein the magnetic choke site has a first wall width, the core having a second wall width, the connection part having a third wall width, the first wall width being smaller than each one of the second and third wall widths.

16. The electromagnetically actuated valve according to claim 14, wherein the core is permanently radially joined to the connection part outside of the magnetic choke site.

17. The electromagnetically actuated valve according to claim 14, wherein the connection part is composed of a nickel-iron alloy or pure nickel.

18. The electromagnetically actuated valve according to claim 14, wherein the magnetic choke site has a wall thickness, the wall thickness being between 0.2 and 0.5 mm.

19. The electromagnetically actuated valve according to claim 14, wherein the magnetic choke site is formed in an axial extension region of the armature.

20. The electromagnetically actuated valve according to claim 14, wherein the armature includes at least one guide surface for axially guiding the armature, the at least one guide surface being positioned in an axial extension region of the magnetic choke site, the at least one guide surface being completely radially surrounded by the magnetic choke site.

21. The electromagnetically actuated valve according to claim 14, wherein the magnetic choke site includes at least one guide surface for axially guiding the armature.

22. An electromagnetically actuated valve, comprising:

a solenoid coil;

a core surrounded by the solenoid coil;

a valve-closure member interacting with a fixed seat valve;

an armature actuating the valve-closure member;

a tubular connection part positioned downstream from the core and at least partially surrounding the armature, the core and the connection part being directly and magneto-conductively interconnected via a magnetic choke site;

wherein the magnetic choke site has a first wall width, the core having a second wall width, the connection part having a third wall width, the first wall width being smaller than each one of the second and third wall widths.

23. An electromagnetically actuated valve, comprising:

a solenoid coil;

a core surrounded by the solenoid coil;

a valve-closure member interacting with a fixed seat valve;

an armature actuating the valve-closure member;

a tubular connection part positioned downstream from the core and at least partially surrounding the armature, the core and the connection part being directly and magneto-conductively interconnected via a magnetic choke site;

wherein the armature includes at least one guide surface for axially guiding the armature, the at least one guide surface being positioned in an axial extension region of the magnetic choke site, the at least one guide surface being completely radially surrounded by the magnetic choke site.

* * * * *